(12) United States Patent
Wikstrom et al.

(10) Patent No.: US 7,389,654 B2
(45) Date of Patent: *Jun. 24, 2008

(54) SYSTEM FOR USE OF LAND FILLS AND RECYCLABLE MATERIALS

(75) Inventors: Jon P. Wikstrom, Eagan, MN (US); Dan Schiller, Woodbury, MN (US); Jon R. Turner, Edina, MN (US); Charles J. Svoboda, New Prague, MN (US)

(73) Assignee: Cool Clean Technologies, Inc., Eagan, MN (US)

( * ) Notice: Subject to any disclaimer, the term of this patent is extended or adjusted under 35 U.S.C. 154(b) by 758 days.

This patent is subject to a terminal disclaimer.

(21) Appl. No.: 10/852,307

(22) Filed: May 25, 2004

(65) Prior Publication Data

US 2005/0000244 A1    Jan. 6, 2005

Related U.S. Application Data

(63) Continuation-in-part of application No. 10/443,453, filed on May 22, 2003, now Pat. No. 6,938,439.

(51) Int. Cl.
*F25J 1/00* (2006.01)
*F25J 3/00* (2006.01)
*F17C 7/02* (2006.01)
*B08B 7/04* (2006.01)
*B08B 3/00* (2006.01)

(52) U.S. Cl. .................. 62/606; 62/929; 62/52.1; 134/12; 134/109; 134/115 R (58) Field of Classification Search ............ 62/606, 62/929, 52.1; 134/12, 109, 115 R See application file for complete search history.

(56) References Cited

U.S. PATENT DOCUMENTS

| 4,681,612 | A |   | 7/1987  | O'Brien et al. ............. 62/624 |
|-----------|---|---|---------|------------------------------------|
| 4,704,146 | A |   | 11/1987 | Markbreiter et al. ......... 62/625 |
| 5,059,405 | A |   | 10/1991 | Watson et al. ............. 423/210 |
| 5,073,203 | A |   | 12/1991 | Al-Ghatta ................. 134/11  |
| 5,279,615 | A |   | 1/1994  | Mitchell et al. ............. 8/142 |
| 5,306,350 | A |   | 4/1994  | Hoy et al. ............. 134/22.14 |
| 5,377,705 | A |   | 1/1995  | Smith, Jr. et al. ......... 134/95.3 |
| 5,412,958 | A | * | 5/1995  | Iliff et al. ................. 68/5 C |
| 5,417,768 | A |   | 5/1995  | Smith, Jr. et al. ........... 134/10 |
| 5,642,630 | A |   | 7/1997  | Abdelmalek et al. .......... 62/632 |
| 5,681,360 | A |   | 10/1997 | Siwajek et al. ............. 48/127.3 |
| 5,690,751 | A |   | 11/1997 | Hosel et al. ................ 134/30 |
| 5,691,290 | A | * | 11/1997 | Vonk et al. ................ 510/212 |
| 5,711,820 | A |   | 1/1998  | Smith et al. ................ 134/12 |

(Continued)

*Primary Examiner*—William C Doerrler
(74) *Attorney, Agent, or Firm*—Mark A. Litman & Associates, P.A.

(57) ABSTRACT

Gases are vented from a waste site such as a landfill, and the gases are separated into at least three streams comprising a hydrocarbon stream, a carbon dioxide stream, and residue stream. At least a portion of the carbon dioxide stream and hydrocarbon stream are liquefied or converted to a supercritical liquid. At least some of the carbon dioxide gas stream (as a liquid or supercritical fluid) is used in a cleaning step, preferably a polymer cleaning step, and more preferably a polymer cleaning step in a polymer recycling process, and most preferably in a polymer cleaning step in a polymer recycling system where the cleaning is performed on-site at the waste site.

22 Claims, 6 Drawing Sheets

U.S. PATENT DOCUMENTS

| | | | |
|---|---|---|---|
| 5,842,357 A | 12/1998 | Siwajek et al. | 62/625 |
| 5,888,250 A | 3/1999 | Hayday et al. | 8/142 |
| 5,943,721 A * | 8/1999 | Lerette et al. | 8/158 |
| 6,039,774 A | 3/2000 | McMullen et al. | 48/102 A |
| 6,129,451 A * | 10/2000 | Rosio et al. | 366/173.2 |
| 6,200,352 B1 | 3/2001 | Romack et al. | 8/142 |
| 6,205,704 B1 | 3/2001 | Schmitz et al. | 47/17 |
| 6,260,390 B1 * | 7/2001 | Carr | 68/18 R |
| 6,312,528 B1 * | 11/2001 | Summerfield et al. | 134/40 |
| 6,383,329 B1 | 5/2002 | Agarwala et al. | 156/344 |
| 6,573,230 B1 * | 6/2003 | Mertens et al. | 510/417 |
| 6,938,439 B2 * | 9/2005 | Wikstrom et al. | 62/606 |
| 6,982,007 B2 * | 1/2006 | Worm et al. | 134/11 |
| 2001/0005812 A1 | 6/2001 | Brookshire et al. | 702/6 |
| 2002/0169223 A1 | 11/2002 | Khan et al. | 521/140 |
| 2003/0053865 A1 | 3/2003 | Ianniello et al. | 405/129.1 |

* cited by examiner

Figure 3. Typical LFG collection system.

Figure 4  Simplified Schematic of Gas Turbine

FIGURE 5 cleaning ↑          ↓ cleaning

FIGURE 6

SYSTEM FOR USE OF LAND FILLS AND RECYCLABLE MATERIALS

RELATED APPLICATION DATA

This Application is a Continuation-in-Part Application under 35 U.S.C. 120, claiming priority from U.S. patent application Ser. No. 10/443,453, filed May 22, 2003, now U.S. Pat. No. 6,938,439.

BACKGROUND OF THE INVENTION

1. Field of the Invention

The present invention relates to the use of gas within landfill sites, the recycling of materials from recycling collection and separation, and the recycling or commercial use of waste effluents materials from land-fills.

2. Background of the Art

A significant societal effect caused by the unceasing growth in world human population is the increased use of a limited supply of raw materials. Both in the field of agricultural and the field of commercial products, an increasing population requires an increasing expenditure of energy and use of material to sustain even the existing average life style. As desires and expectations are growing around the world within every population center for higher standards of living, there is a multi-faceted draining effect on resources. Increased production capacity has been able to sustain this growth for centuries, but even the most optimistic technologist must appreciate that there is a finite limit to growth and production given the closed system of the Earth.

Recycling has been one direction of increased effort in reutilization of materials to conserve dwindling original supplies. Initially, recycling involved the wholesale reuse of objects, such as beverage containers where return fees or deposits were placed on the containers, the fees were returned to the purchaser with return of the containers, and the containers were cleaned and returned into the production line to be refilled. The limitations on this system included at least the facts that the containers would show unacceptable levels of wear fairly early during repeated reuse (especially with bottles that could be easily scratched or chipped), containers had to be returned to individual original suppliers according to brand names (which dictated against any centralized system), and cleaning was difficult as different co-wastes were added to the containers (e.g., cigarette stubs and filters) and few viable cleaning processes could remove some of the associated wastes without extensive manual labor.

One of the more successful recycling programs has involved the recycling of aluminum beverage containers. The success has been accomplished because of some unique attributes in the specific product. The material itself (the aluminum) is easily melted and placed back into the natural manufacturing stream. Associated materials in the product (e.g., inks, coating materials, lid adhesives, and the like) are easily removed from the aluminum by the heating needed to melt the aluminum (and with possible solvent treatment), and solid wastes added to the aluminum containers can be removed by physical processes (e.g., shredding of cans and washing/flotation) alone or in combination with the melting steps needed for recycling. This model, however, does not translate well to other materials, as the properties, economics, technology and market for aluminum are unique, and it is this uniqueness that enables success of the system.

Certain classes of polymeric materials are presently recycled in commercial systems relying in great part on collection of polymeric containers from residential and commercial sites. This system is complicated in that associated wastes with differing sources of polymeric materials may not be amenable to a single format of treatment. Although local jurisdictions may require some level of cleaning of the polymeric containers, the original liquids or powders may be insufficiently removed from the polymer. These materials may vary from water, beverages, detergents, oils, alkaline cleaners, and highly toxic materials, including pesticides. In addition, the containers may contain labels that are applied by adhesives of different strengths, and the label stock itself may need to be treated by distinct processes. A single cleaning process has been unlikely to act on all polymeric containers, at least in part because of the deficiencies in the cleaning steps that fail to provide a sufficiently pure supply of polymer that would enable direct recycling.

Recycling of motor oil containers is illustrative of the problem. Motor oil containers typically are high-density polyethylene (HDPE) which lends itself well to recycling if it is sufficiently clean. However, residual oil coating the interior surface of the "empty" motor oil containers constitutes a contaminant that prevents use of the containers as high grade plastics. Based upon measurement of samples of used motor oil containers, this residual oil coating appears to average 4.6 percent of the weight of the used plastic container and can represent as much as 20 percent of the container weight. Estimates are that over one billion one-quart plastic containers were filled with motor oils in the United States in 1993. If 4.6 percent by weight of those containers is motor oil, the one billion empty plastic containers represent approximately 160 million pounds of plastic and over 7 million pounds of motor oil that could be recovered for reuse if an appropriate separation method were available. However, because the motor oils have not been easily separated from the plastic containers, the vast majority of these containers are currently disposed of in landfills, leaking oils into the soil and groundwater, and occupying significant landfill volume.

Current available options to landfilling the waste plastics include (a) grinding the containers and using them in other plastic recycling processes on a very limited (dilute) basis; (b) using an aqueous process to displace the oil from the plastic; (c) using a halogenated solvent to dissolve/dilute the oil; or (d) using a combustible or flammable solvent to dissolve/dilute the oil from the plastic.

The problems with these options are as follows:

a. Existing recyclers in the United States can blend limited quantities of oil contaminated plastics in recycled plastic products. Large quantities cannot be blended because of the undesirable effects of the residual oil on the recycled plastic properties. Examples include "plastic lumber" and lower grade plastic products.

b. Aqueous processes can be used to displace the oil from the plastic. However, detergents and/or surfactants are required to assist displacement of the oils. A stream of usable oil-free plastic will be generated by this method; however, the displaced oil will be contaminated or changed chemically and additional processing will be needed to separate it from the aqueous solutions. The aqueous solutions themselves will be a secondary waste stream that will require treatment before being recycled or discharged as waste water.

c. Halogenated solvents can be used to dissolve/dilute the oils from the plastic. Again, usable plastic will be obtained by this process if the solvents do not extract essential components from the plastic. The halogenated solvent solutions will require distillation to recover the oils and recycle the solvents. In general, it is difficult to fully reclaim usable oil from the distillate. Furthermore, many halogenated solvents are ozone depleting compounds and potential health hazards to humans, and therefore their use and release into the environment are under regulation and close scrutiny by federal and state governments.

d. Combustible or flammable solvents may be used to dissolve and/or displace the oil from the plastic. Usable plastic can be generated by this method if the solvents do not extract essential components from the plastic. The combustible or flammable solvent solutions will require distillation to recover the oils and recycle the solvents. Only distillation equipment suitable for combustible or flammable solvents may be used and even then fire safety concerns will be significant. As in the case of the use of halogenated solvents, the oil may not be fully recoverable from the distillation.

The methods described above can provide some usable plastic from oil-contaminated plastics. However, they will provide usable oil only at the expense of a secondary waste stream that itself will require treatment and additional expense. The recycling of plastic and oil from "empty" plastic oil containers presents serious environmental and waste stream disposal problems if conventional organic or aqueous solvents are used for the separation of the plastic and oil. Discarding of the containers as landfill waste also presents environmental problems in that the residual oil may eventually leach into soil and groundwater.

Landfills provide the most complex issue to be faced in the entire realm of waste disposal, with the possible exception of long-term storage of nuclear wastes. Landfills are little more than holes in the ground into which massive volumes of wastes are dumped, compacted and covered, with an unsupported expectation that the material will eventually decompose and be absorbed into the normal ecology. This expectation is unsupported because excavations of earlier ($19^{th}$ and early $20^{th}$ century) landfills have found that even paper products, including newspapers, are substantially intact (if not structurally pristine) over a time period where decomposition had been expected. Present attempts to moderate the impact of landfills have met limited environmental and limited economic success.

The typical landfill reclamation attempts have included providing gas vents into the covered masses of landfilled materials, separating out three streams of gas, the streams usually distinguished along the lines of highly volatile organic streams including methane, carbon dioxide, and commercially unsuitable mixtures of gases. The separations can be performed by various techniques selected from amongst semi permeable membranes, filtering membranes, differential condensation, differential absorption, differential solvency absorption, molecular sieves and combinations of these technologies. The non-commercial gases are often vented and flared directly in the atmosphere. The volatile hydrocarbon gas can be liquefied and used for fuels, usually with onsite condensation of the hydrocarbon gas. (The stream usually comprises at least or only methane. In some uses, other low carbon hydrocarbons such as ethane and some propane may be included in the hydrocarbon gas stream, in a separate stream, or in the waste stream, but these other hydrocarbons are usually removed as part of the residue gas stream. The hydrocarbon gas has been used for pipeline natural gas or compressed natural gas for vehicles. The carbon dioxide has also been liquefied, but has found few commercial outlets of sufficient volume as to make that product stream economically supportive of the recycling process. Part of the reason is the hesitancy of the largest volume of commercial use of carbon dioxide (carbonated beverages) to use carbon dioxide sourced from landfill waste streams in their products. The first manufacturer to use this source of carbon dioxide would be quickly attacked in the market by its competitors, even though the carbon dioxide greatly exceeds the purity required by the industry.

U.S. Pat. No. 5,279,615 discloses a process for cleaning textiles using densified carbon dioxide in combination with a non-polar cleaning adjunct. The preferred adjuncts are paraffin oils such as mineral oil or petrolatum. These substances are a mixture of alkanes including a portion of which are $C_{16}$ or higher hydrocarbons. The process uses a heterogeneous cleaning system formed by the combination of the adjunct which is applied to the textile prior to or substantially at the same time as the application of the densified fluid. According to the data disclosed in U.S. Pat. No. 5,279,615, the cleaning adjunct is not as effective at removing soil from fabric as conventional cleaning solvents or as the solvents described for use in the present invention as disclosed below.

U.S. Pat. No. 5,316,591 discloses a process for cleaning substrates using liquid carbon dioxide or other liquefied gases below their critical temperature. The focus of this patent is on the use of any one of a number of means to effect cavitation to enhance the cleaning performance of the liquid carbon dioxide. In all of the disclosed embodiments, densified carbon dioxide is the cleaning medium. This patent does not describe the use of a solvent other than the liquefied gas for cleaning substrates. The combination of ultrasonic cavitation and liquid carbon dioxide may be well suited to processing complex hardware and substrates containing extremely hazardous contaminants.

U.S. Pat. No. 5,377,705, issued to Smith et al., discloses a system designed to clean parts utilizing supercritical carbon dioxide and an environmentally friendly co-solvent. Parts to be cleaned are placed in a cleaning vessel along with the co-solvent. After adding super critical carbon dioxide, mechanical agitation is applied via sonication or brushing. Loosened contaminants are then flushed from the cleaning vessel using additional carbon dioxide.

U.S. Pat. No. 5,417,768, issued to Smith et al., discloses a process for precision cleaning of a work piece using a multi-solvent system in which one of the solvents is liquid or supercritical carbon dioxide. The process results in minimal mixing of the solvents and incorporates ultrasonic cavitation in such a way as to prevent the ultrasonic transducers from coming in contact with cleaning solvents that could degrade the piezoelectric transducers.

U.S. Pat. No. 5,888,250 discloses the use of a binary azeotrope comprised of propylene glycol tertiary butyl ether and water as an environmentally attractive replacement for perchlorethylene in dry cleaning and degreasing processes. While the use of propylene glycol tertiary butyl ether is attractive from an environmental regulatory point of view, its use as disclosed in this invention is in a conventional dry cleaning process using conventional dry cleaning equipment and a conventional evaporative hot air drying cycle.

U.S. Pat. No. 6,200,352 discloses a process for cleaning substrates in a cleaning mixture comprising carbon dioxide, water, surfactant, and organic co-solvent. This process uses carbon dioxide as the primary cleaning media with the other components included to enhance the overall cleaning effectiveness of the process. There is no suggestion of a separate, low pressure cleaning step followed by the use of densified fluid to remove the cleaning solvent. As a result, this process has many of the same cost and cleaning performance disadvantages of other liquid carbon dioxide cleaning processes. Additional patents have been issued to the assignee of U.S. Pat. No. 6,200,352 covering related subject matter. Liquid carbon dioxide is usually the cleaning solvent.

U.S. Pat. No. 6,558,432 describes a textile cleaning system that utilizes an organic cleaning solvent and pressurized fluid solvent is disclosed. The system has no conventional evaporative hot air drying cycle. Instead, the system utilizes the solubility of the organic solvent in pressurized fluid solvent as well as the physical properties of pressurized fluid solvent. After an organic solvent cleaning cycle, the solvent is extracted from the textiles at high speed in a rotating drum in the same way conventional solvents are extracted from textiles in conventional evaporative hot air dry cleaning machines. Instead of proceeding to a conventional drying cycle, the extracted textiles are then immersed in pressurized fluid solvent to extract the residual organic solvent from the textiles. This is possible because the organic solvent is soluble in pressurized fluid solvent. After the textiles are immersed in pressurized fluid solvent, pressurized fluid solvent is pumped from the drum. Finally, the drum is de-pressurized to atmospheric pressure to evaporate any remaining pressurized fluid solvent, yielding clean, solvent free textiles. The organic solvent is preferably selected from terpenes, halohydrocarbons, certain glycol ethers, polyols, ethers, esters of glycol ethers, esters of fatty acids and other long chain carboxylic acids, fatty alcohols and other long-chain alcohols, short-chain alcohols, polar aprotic solvents, siloxanes, hydrofluoroethers, dibasic esters, and aliphatic hydrocarbons solvents or similar solvents or mixtures of such solvents and the pressurized fluid solvent is preferably densified carbon dioxide.

To make landfills better able to service the environment and to assist in the recycling of materials not added to the landfill mass, different technologies, processes and business models are needed.

SUMMARY OF THE INVENTION

Gases are vented from a waste site such as a landfill, and the gases are separated into at least three streams comprising a hydrocarbon stream, a carbon dioxide stream, and a residue stream. At least a portion of the carbon dioxide stream and hydrocarbon stream can be liquefied or converted to a supercritical liquid. New uses of the effluent gas streams are desirably found within the economic Environment and local physical environment of the waste site, and preferably physically within or adjacent to the waste site to improve the economic performance of the system. At least some of the carbon dioxide gas stream (as a liquid or supercritical fluid) may be used in a cleaning step, preferably a polymer cleaning step, and more preferably a polymer cleaning step in a polymer recycling process, and most preferably in a polymer cleaning step in a polymer recycling system where the cleaning is performed preferably on-site at the waste site or in direct pipeline connection to the carbon dioxide source in the waste site. Hydrocarbon gas may be used at least in part to generate energy at the site (e.g., by burning to create heat/thermal energy, to drive a motor or engine, or to generate electricity), provide a hydrogen fuel source, provide carbon black and the like.

DETAILED DESCRIPTION OF THE INVENTION

One aspect of the present invention is to provide a more economically viable system associated with landfills. In the absence of greater economic benefits to the owners and investors in landfills, the ability of landfills to assist in actual waste reduction is limited. It is therefore necessary to associate additional technologies to existing and future landfill sites and or MRFs (material recovery facility) to assure maximum use of the materials at the site that can be used in subsequent commercial processes. This use of available resources includes the addition of commercial systems to the recycling sites and the use of effluent gases in existing and developing commercial processes. The fact that in most jurisdictions recycling and landfill sites are closely aligned can assist in the improvement in landfill utilization, as the recycled materials (e.g., paper, plastic, and metals such as aluminum and steel) and the waste material (for the landfill) are already brought to a common area. For the purpose of this invention, a common site or a site shall be considered an area wherein collected gases can be transported without accessing or establishing non-piped (that is, transportation by means other then pipes and tubes that involved separate containerizing of gases and physical transport of the containers) substantial gas transportation systems for one or more of the gas products. For example, typical sites would have no more than a ten mile (18 km) distance separating gas venting from gas collection and gas compression and compressed gas (e.g., gas, liquid or supercritical liquid) from commercial process use and transport the gases over that distance through pipes and tubes.

Gases are vented from a waste site such as a landfill, and the gases are separated into at least three streams comprising a hydrocarbon stream, a carbon dioxide stream, and residue stream. In a preferred practice of the invention, at least a portion of the carbon dioxide stream and hydrocarbon stream are liquefied or converted to a supercritical liquid. In a preferred embodiment, at least some of the carbon dioxide gas stream (as a liquid or supercritical fluid) is used in a cleaning step, preferably a container cleaning steps, such as a polymer or metal cleaning step, and more preferably a polymer cleaning step in a polymer recycling process, and most preferably in a polymer cleaning step in a polymer recycling system where the cleaning is performed on-site at the waste site. The cleaning step may also be used in cleaning of "electronic waste," that is electronic equipment such as telephones, computers (PC's, Mac's, lap tops, hand-held, etc.), pagers, radios, VCR's, CD players, televisions, DVD players and other devices that may contain chip boards. The cleaning step may be used for any waste material that has organic or metal contaminants.

Particularly desirable and commercially effective on-site uses include, but are not limited to at least partially energy-independent processes (energy being provided by burning of a portion or all of the hydrocarbon gas stream to provide heat or ultimately electricity), carbon dioxide based cleaning processes, polymer recycling (especially including a carbon dioxide-based cleaning step), dry ice manufacture, and the like. Commercially available equipment is marketed that enables electrical generation from hydrocarbon gases (referred to as Gen-sets in the trade), often using boiler systems that are powered by combustion of the gas and drive generators. Commercial dry ice systems are available, and according to the present invention, those dry ice systems could be powered on site by electricity provided by burning of the hydrocarbon gases.

There are a number of related aspects of the invention that can be used separately or combined in various proportions to practice benefits of the present invention.

One aspect of the invention would require the performance of steps on site (within 18 km of the collections site or waste site where gases are generated) that enhance the economic benefits of maintaining and operating a landfill system, as opposed to merely providing a landfill site. Among the individual specific tasks that can be performed on site at the waste system could include one or more of the following, which is not intended to be totally inclusive. Such ancillary tasks, in addition to capturing the two primary revenue potential gas streams (e.g., the hydrocarbon stream and carbon dioxide stream), would include hydrogen production, carbon black production, carbon dioxide liquefaction, and other value enhancing material production processes directed towards an effluent stream. One attempt at this type of technology is discussed in a paper relating to an Acrion Technologies, Inc. business plan for the production of methanol from landfill gas. http://www.netl.doe.gov/publications/proceedings/97/97ng/ng97_pdf/NGP4.PDF provides the complete business plan document. This limited disclosure is specific to energy use in methanol production.

Preferred technologies for use of on-site developed energy from the hydrocarbon gas stream from the landfill gas (LFG) include energy for compression of the gas streams, transport of the gas streams and other materials, electrolysis of water to produce hydrogen and oxygen in capturable forms at high purity, catalytic treatment of the gas streams to produce carbon black and/or hydrogen (e.g., see "Hydrogen from Natural Gas without Release of $CO_2$ to the Atmosphere" Gaudernack, Bjorn and Lynum, Stynar, 1996, Proceedings of the $11^{th}$ World Hydrogen Energy Conference, Stuttgart, Germany, HYDROGEN ENERGY PROCESS XI, pages 511-23 and *Hydrogen Power: Theoretical and Engineering Solutions*, Hox, Ketil et al., 1998 Kluwer Academic Publishers, Netherlands, pp. 143-148, which references are incorporated herein by reference in their entirety for the disclosure of carbon black generation processes and hydrogen generation processes from hydrocarbon gas streams. Additional background information on reformation of hydrocarbons is provided by U.S. Pat. Nos. 5,648,582; 6,254,807; 6,402,989; 6,409,940; 6,458,334; and 6,488,907. These processes are specifically among the processes that can be used on-site or in piped connection to collected gases from the gas-generation sites as part of the practice of technologies within the scope of the present invention. The use of other known processes in combination with these processes can provide synergy with the individual processes or to the entire economic strategy. For example, infrared or ultraviolet treatments can be used in conjunction with the cleaning processes, and some of the energy for those treatments can be provided by burning gas streams or by exchanging gas streams with a separate commercial energy source for other available energy (e.g., electricity).

Figure 1:
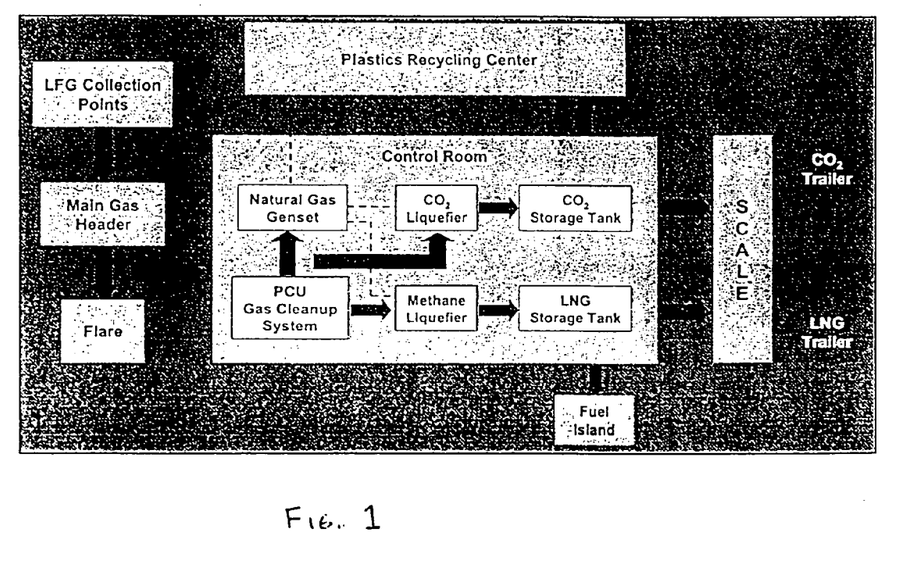
FIG. 1 shows a block diagram of a sited recycling, reclamation and use center according to one practice of the present invention.
Figure 2:
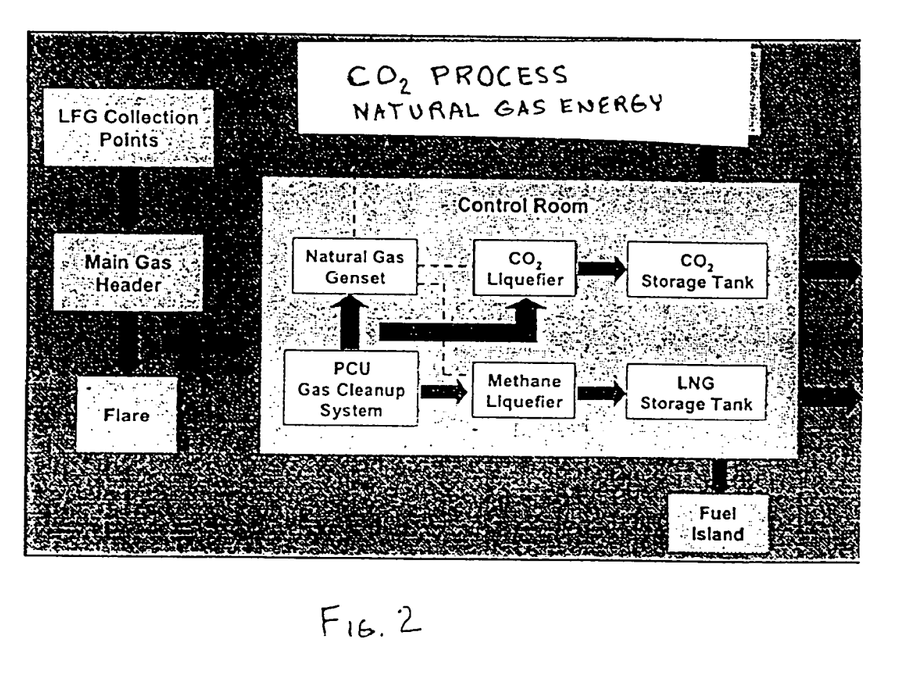
FIG. 2 shows a block diagram of a generic sited production, reclamation and use center according to one aspect of the invention.
Figure 3:
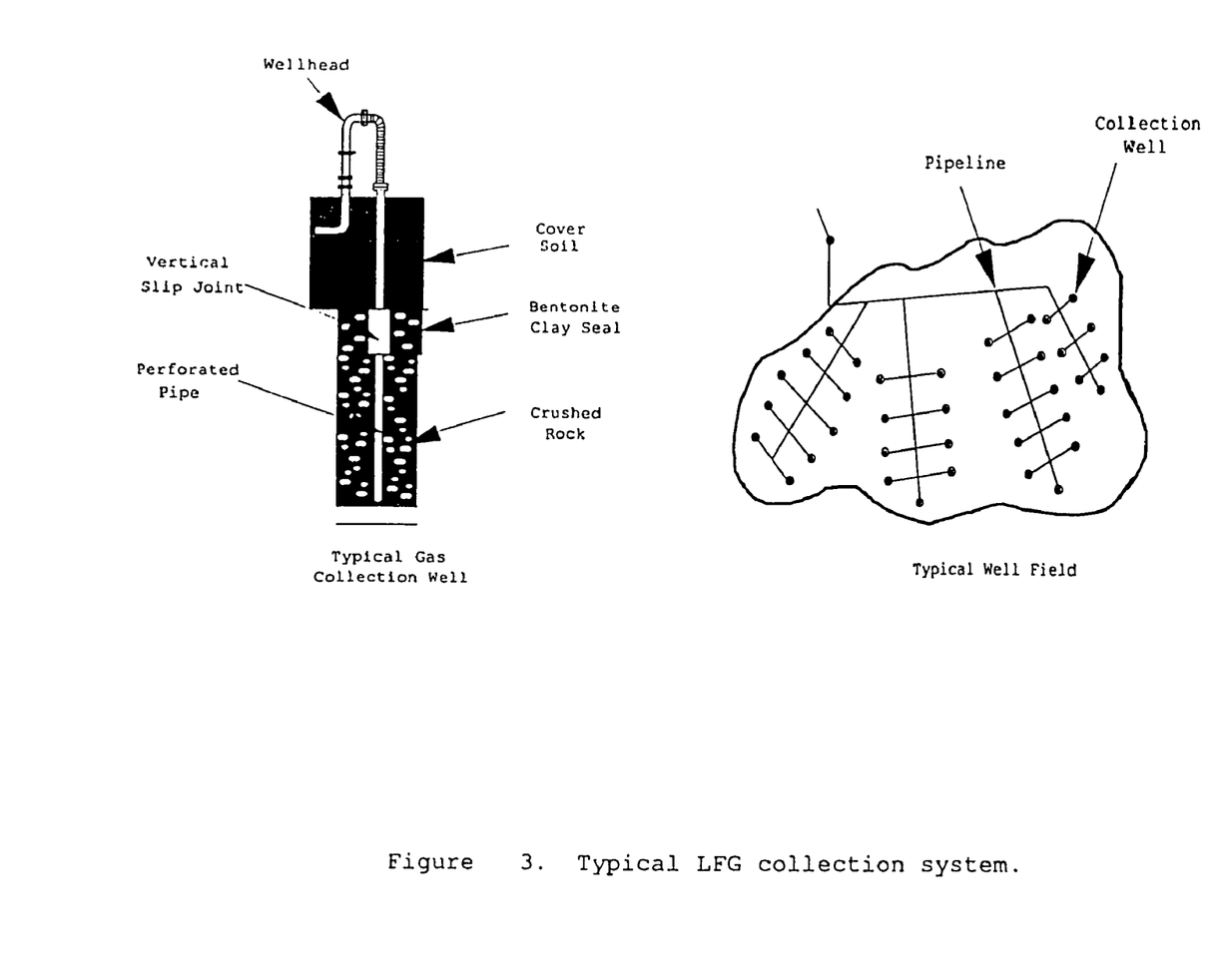
FIG. 3 shows a typical land fill gas (LFG) collection system.
Figure 4:
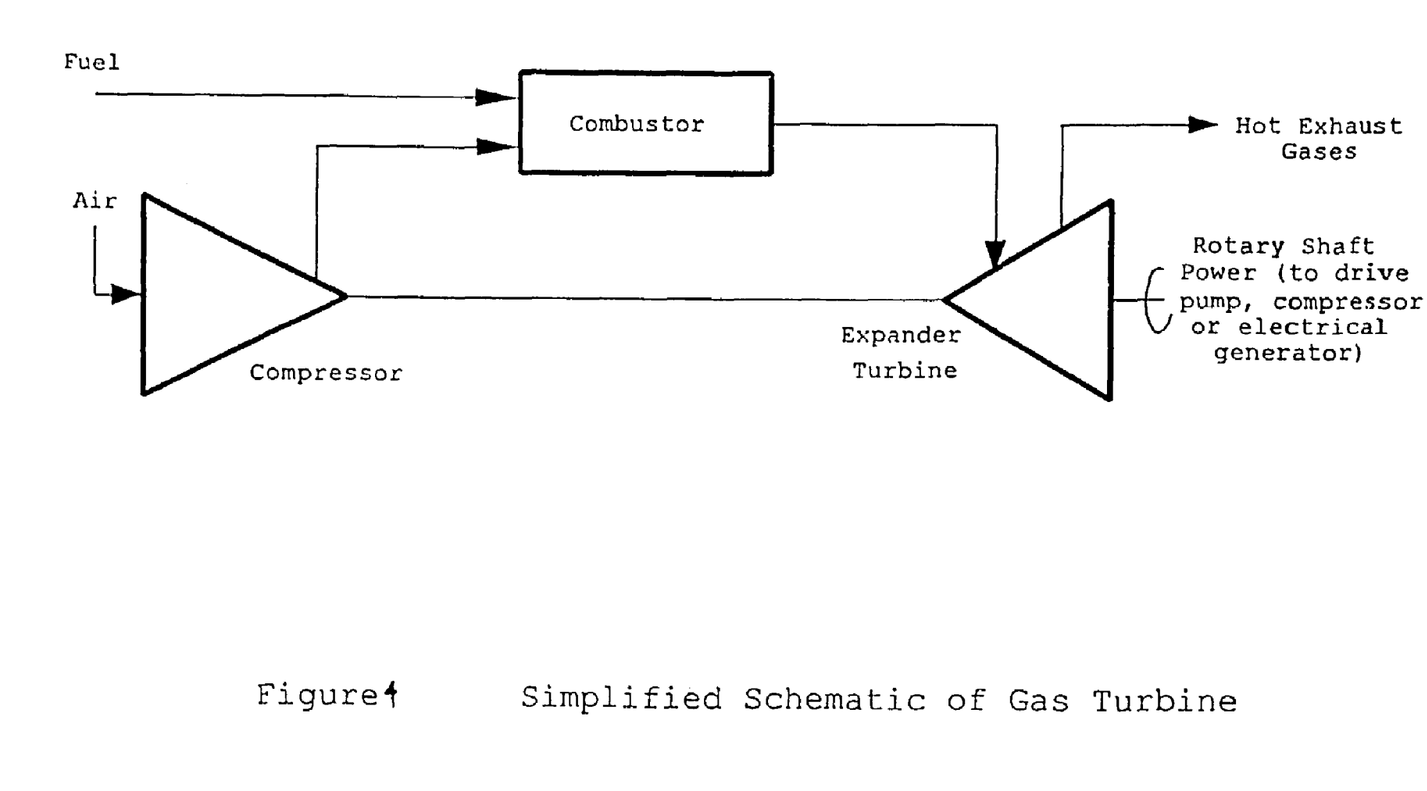
FIG. 4 shows a simplified schematic of a gas turbine that may be used at a site of the present invention.

A preferred embodiment of a landfill gas processing facility of the present invention is generally indicated at 10 in FIG. 1. The landfill gas processing facility is preferably located near a landfill such that the transportation of landfill gases from the landfill to the facility is accomplished by means of a direct piping system without first compressing the landfill gases or having to truck the landfill gases from the landfill to the facility. Alternatively, it is also within the scope of the present invention to transport the landfill gases from the landfill to the facility if economically feasible. A gas collection system is positioned within the landfill and connects to the piping system. Such gas collection systems typically comprise a series of perforated pipes or conduits and are known in the art. In FIG. 1, an example of an entire system that can be positioned on site comprises the Land-Fill Gas (LFG) collection points and a main gas header to separate waste gases (that are then usually flared, although even this low energy fuel source could be used as energy within the system, even reducing existing polluting levels by cleaning the burnt/flared stream). The separated gas stream including the carbon dioxide and hydrocarbon gases is then treated in a system to separate the hydrocarbons gases and carbon dioxide (in this case shown as a pressure condensation unit or PCU). A portion of the hydrocarbon stream (primarily methane) is then sent to a further condensation unit (methane liquefier) and the carbon dioxide is sent to carbon dioxide liquefier ($CO_2$ Liquifier), preferably where energy from a natural gas generator (Genset) provided by burning a portion of the 'natural gas' (methane and/or other hydrocarbons) is used to drive the carbon dioxide liquefaction. Portions of the carbon dioxide stream (either directly from the carbon dioxide stream or from the liquefier) are shown to be directed towards a cleaning facility on site (e.g., in this example, a plastic recycling center). The liquefied carbon dioxide is shown as then stored in a $CO_2$ storage tank and liquefied methane is shown in a liquid natural gas (LNG) storage tank. Shipment or sale of these stored gases can be provided with a weighing station (Scale) where it can be loaded onto a $CO_2$ trailer or LNG trailer for shipping to more distal users. A fuel island is also shown for local use or tank filling with LNG, as with internal (site internal) cartage vehicles or transportation vehicles.

Upon collection, the landfill gas enters the facility as a single stream and is delivered to a pre-conditioning unit. Depending upon the selected landfill or gas collection site, and also dependent on the stage at which the selected landfill or gas collection site is producing landfill gas, the composition of the landfill gas may vary. Generally, the landfill gas has about an equal composition of both methane and carbon dioxide, along with a minimal amount of nitrogen and trace amounts of other gases. An exemplary composition of a landfill gas for use with the present invention is listed in the Column under Raw Landfill Gas in Table 1. It should be understood, however, and as is known in the art, that there may be substantial fluctuations in the composition of the landfill gas, and that such fluctuations are well within the scope of the present invention.

The pre-conditioning unit separates the landfill gas into a first stream substantially comprising methane, and a second stream substantially comprising carbon dioxide. By substantially comprising it is meant that the dominant component of each stream comprises at least about 90% of the respective stream, by volume. An exemplary composition of the methane stream is listed in the Column under Methane Product in Table 1, while an exemplary composition of the carbon dioxide stream would comprise the carbon dioxide and materials (e.g., hydrocarbons) absorbed therein. It should be noted that these compositions are for descriptive purposes only, and that variations of each are well within the scope of the present invention. If the composition of the methane stream contains a minimum amount of methane to provide adequate energy upon combustion, a fuel stream is fed from the methane stream to an electrical generator capable of being powered by the combustion of the methane. The electrical generator is provided to generate a minimum amount of electricity to power the facility and any action taking place within the facility, including the collection of the landfill gases, vehicle travel within or near the site, making the facility self-reliant, independent of outside power sources. Thus, the minimum amount of methane needed to provide adequate energy to the facility is dependent upon the size of the facility and the type of electrical generator being used. If the composition of the methane stream is not great enough to provide adequate energy upon combustion for the electrical generator to power the facility, the methane stream must first be enriched. Flue gases from the electrical generator can be vented to the atmosphere or routed back through the pre-conditioning unit to separate unspent methane and carbon dioxide. Scrubbers can be added to remove other combustion gases, including nitrous oxides and carbon monoxides.

Regardless if upon exiting the pre-conditioning unit the methane stream is suitable for combustion within the electrical generator, in most situations the methane stream will have to be enriched in order to match the quality of natural gas obtained by more conventional methods. The methane stream connects to a methane enriching unit, which is positioned downstream from the pre-conditioning unit. The methane enriching unit further enhances the methane properties of the methane stream by separating out non-methane components, including carbon dioxide, nitrogen and other trace components. Upon exiting the methane enriching unit, the enriched methane stream preferably has a methane content of about 97%, by volume. An exemplary composition of the enriched methane stream is listed in Table 4.

TABLE 4

| % By Volume | Material |
|---|---|
| 98% | Methane |
| 0.5% | Oxygen |
| 0.3% | Nitrogen |
| 0.2% | $CO_2$ |
| 1.0% | Other |

At this concentration, the methane is suitable for most industrial applications. The enriched methane is then either left in a gaseous state or condensed to compressed natural gas or liquid natural gas for further processing. It is desirable to have low oxygen content in this enriched methane stream. This can be accomplished by the use of semipermeable membranes or absorptive materials that selectively remove oxygen from the stream.

One such process is the production of carbon blacks, or gas black. Carbon blacks are used to reinforce rubber products such as tires and as reducing materials in metallurgic industries. Carbon blacks are an amorphous form of carbon particles formed by the thermal or oxidative decomposition of methane. A preferred process for forming the carbon blacks of the present invention includes the Kvaemer Carbon Black and Hydrogen Process, which produces both carbon black and hydrogen without emissions. The Kvaemer process is a plasma process for forming carbon blacks and hydrogen. However, other processes for forming carbon blacks are well within the scope of the present invention, including a channel black method, a lamp black method, a furnace black method and a thermal black method, all terms known in the art. Both the carbon blacks and the hydrogen can be sold wholesale as commodities.

In addition to carbon blacks, excess methane can be used in other processes to form hydrogen. One such process is steam methane reforming (SMR). In the SMR method, water in the form of steam is combined with methane to form hydrogen and carbon monoxide or other reforming processes. The carbon monoxide shifts to form carbon dioxide and hydrogen. The hydrogen can be captured and used to help generate power to heat the steam, with the excess being sold as a commodity. The steam may also be used for thermal heating at the facility by cycling the steam or condensed steam (hot water) through radiator pipes at the facility.

Also positioned downstream from the pre-conditioning unit is a condensing unit to liquify the carbon dioxide stream. The carbon dioxide condensing unit connects to a storage tank wherein the liquified carbon dioxide is sent. From the storage tank, the liquified carbon dioxide can be sent to transportation tanks for sale in industrial uses. Alternatively, and more preferably, the liquid carbon dioxide is utilized on-site in the cleansing of substrate materials. In the practice of the present invention, both of these processes, as well as other processes, may be practiced on site.

Provided within or proximate the facility of the present invention is a cleaning apparatus. The cleaning apparatus utilizes liquid carbon dioxide to facilitate the removal of contaminants from the substrate materials. The preferred cleaning apparatus is similar to those fully described in U.S. Pat. Nos. 5,904,737, 6,216,302, 6,257,282, 6,349,947, and 6,442,980, all of which are hereby incorporated herein by reference. It should be noted, however, that other cleaning apparatuses, including those manufactured by Sailstar, Electrolux and Alliance are well within the scope of the present invention. Preferably, the substrate material includes plastics gathered from used or recycled containers. Such plastics include, but are not limited to, polyethylene (especially high density polyethylene "HDPE," low density polyethylene "LDPE"), polyethylene terephthalate (PET) and polyvinyl chloride (PVC). In many communities, the plastic containers are separated from refuse by consumers and are collected by recycling centers to be reprocessed into new forms. In other situations, the plastic containers are separated at the landfill, or even mined from within the landfill. Extraction of the contaminants, such as motor oil, from the containers typically results in acquiring two marketable products: recycled plastics and sometimes usable oil. The preferred extraction process is identical to that disclosed in U.S. Provisional Application No. 60/420,017, filed on Oct. 21, 2002 and entitled Extraction Process Utilizing Liquified Carbon Dioxide, which is hereby incorporated herein by reference. After extracting the oil from the substrate material, the plastics can sold in bulk to plastic processing facilities for reuse or even deposited within the landfill without the possible harm of contaminating the soil with oil. The oil extracted from the plastics is removed from the solvents, collected and may be sold as a commodity or as a fuel.

Alternatively, other extraction processes utilizing carbon dioxide are well within the scope of the present invention. Such process include, but are not limited to, the following: processes employing carbon dioxide as a solvent or co-solvent; processes employing liquid carbon dioxide as a solvent or co-solvent; processes employing super critical carbon dioxide as a solvent or co-solvent; and processes employing any combination of carbon dioxide, liquid carbon dioxide or super critical carbon dioxide as a solvent or co-solvent. In addition to the cleaning of plastics, the process of the present invention can be applied to other materials including, but not limited to, other refuse materials brought to be deposited into the landfill that contain contaminants capable of being removed by carbon dioxide, 'e-waste' such as boards and materials from computers, microprocessors, cellular phones, CRT monitors, and dry-cleaning facilities. The $CO_2$ cleaning processes that may be used with usable wastes in the practice of the invention may also be used in the cleaning of glass and ceramic surfaces. Glass is a particularly desirable surface to be cleaned in this manner as the treatment may both clean and polish glass surfaces.

It is important to recognize that the total economic potential of landfill systems, sewage treatment plants, fertilizer plants, and animal waste collection sites (which are collectively referred to herein generically as 'gas stream sites' or 'waste sites') have not been realized. In large part this is because there has been no consideration of the collective use of the waste streams. Even the pilot attempt described above in methanol conversion basically has provided little more than a break even economic flow in the production of methanol. It is therefore a benefit of the present system that multiple uses of multiple streams can be effected, rather than merely working one or two single streams for a narrow use. For example, the following combinations of processes can be combined in a single operating site. A single site is defined in the practice of the present invention where gas flows from the waste site are directly carried to the process streams through a direct piping stream. A direct piping stream would include addition of methane to a local gas stream (metering the input to the local stream) and withdrawing gas downstream for a process stream, the volume withdrawn for the process stream being compared to the addition volume to determine user costs and contributions.

The present invention may use the hydrocarbon gas stream to produce energy for multiple uses of both the hydrocarbon gas stream and the carbon dioxide stream, and by positioning recycling facilities or separation facilities adjacent the gas stream site, the energy and products of the at least three gas streams can be used in a more unified efficiency and provide significant economic improvement to the entire system. Considered in this perspective, the association of different processes as set forth below is more than a mere collection of dissimilar processes, but an integration of processes to maximize use of materials and economies.

One example of a combined process system operating off at least three gas streams previously identified could be selected from the groups consisting of at least all of the process described, along with additional processes that can be added into the flow of the gas streams from the gas stream site:

1) energy production, carbon black production, and hydrogen production;
2) energy production, carbon dioxide liquifaction (including supercritical liquid formation), and apparel cleaning;
3) energy production, carbon dioxide liquifaction (including supercritical liquid formation), and plastic cleaning;
4) energy production, carbon dioxide liquifaction (including supercritical liquid formation), plastic cleaning and pellitization of cleaned plastic;
5) energy production, carbon dioxide liquifaction (including supercritical liquid formation), plastic cleaning, plastic pellitization, and plastic molding or extrusion (e.g., structural beam plastic, plastic sheeting, plastic poles, plastic tubing, etc.);
6) energy production, carbon dioxide liquifaction (including supercritical liquid formation), and aluminum cleaning;
7) energy production, carbon dioxide liquifaction (including supercritical liquid formation), aluminum cleaning, and cleaned aluminum ingot/sheeting formation;
8) energy production, carbon dioxide liquifaction (including supercritical liquid formation), and glass/ceramic cleaning; and
9) energy production, carbon dioxide liquifaction (including supercritical liquid formation), glass cleaning and glass melting processes.

In the performance of these processes, the system has been shown to be able to exceed the traditional break even points of the economics of waste sites and gas stream sites that have limited their success. The performance of at least the processes as grouped, and the addition of other processes from the other groups, particularly at a single site where transportation costs from process to process are reduced or eliminated can provide a gas stream site that can exceed mere survivability and produce a significant positive cash flow while improving waste utilization and increasing the benefits from recycling.

Such new process steps as pumping some carbon dioxide (with water added) back into the land fill through tubes or pipes can increase gas production rates, again using waste stream gas to improve the economics of the total system. The carbon dioxide used in this gas stimulation stream can be recycled from other processes, such as a cleaning process, or from a waste gas stream cleaning scrubber (e.g., from the burning of hydrocarbons) to further minimize external additions of materials, energy, or capital to the system.

One particularly desirable system would be establishing an apparel cleaning site proximal to the source of the at least three gas streams. Energy from burning a portion of the hydrocarbon can be used to power at least some of the energy requirements for carbon dioxide condensing/liquefaction, carbon dioxide-based apparel cleaning, recondensation/purification of the effluent stream of carbon dioxide from the apparel cleaning. The effluent carbon dioxide stream can be used, as described above, to stimulate hydrocarbon gas venting/collection/production in the gas stream site.

The waste materials to be recycled or treated may be first prepared by a number of pretreatments. These pretreatments may include, by way of non-limiting examples, water wash or spray, cutting/shredding, soaking, solvent soaking, cosolvent soaking, agitation with or without solvent/cleaner present), sonication in solvent/carrier, coheat treatments with solvents, and the like.

A non-limiting list of solvent systems for removal of label stock in polymeric container recycling includes a mixture (5:95% by volume to 95-5% by volume) of at least one cosolvent selected from the group consisting of terpene alcohol, d-Limonene, and isoparaffinic hydrocarbons and at least a second cosolvent selected from the group consisting of C1-C6 alkyl lactates (especially C1, C2, C3 and C4 alkyl lactates, such as methyl lactate, ethyl lactate, propyl lactate and butyl lactate). Such materials are commercially available as a terpene alcohol based solvent such as environmentally safe Tarksol®, made by Tarksol, Inc., d-Limonene (Chemical Abstract Series No. 5989-27-5), or isoparaffinic hydrocarbon (Chemical Abstract Series No. 64742-48-9). These solvents may be used on the label containing (preferably shredded) polymeric materials according to the teachings of U.S. Pat. No. 6,514,353, which teaches the use of only the first set of solvents as label removing materials. That patent is incorporated by reference for its teachings of solvent application processes, apparatus and materials.

D-limonene is known in certain cleansing solutions such as taught by Dotolo et al. (U.S. Pat. No. 5,346,652) describe a non-aqueous fingernail polish remover based upon a d-limonene, N-methyl pyrrolidone (abbreviated NMP), and cetyl acetate solvent system. However, d-limonene is harmful if swallowed, can be irritating, causes drying, reddening, and sensitization of the skin, and is moderately to highly irritating to the eyes (MSDS, d-limonene, Florida Chemical Co., Inc., Winter Haven, Fla.). Similarly, Bayless (U.S. Pat. No. 5,372, 742) describes a non-aqueous liquid cleaner suited for removing nail polish, based upon d-limonene, ethyl lactate, and cetyl acetate. The use of this novel cosolvent-based carbon dioxide, polymer-cleaning system (particularly for the removal of labels) is novel in its own right.

As a separate site or in addition to other process plants established using at least a portion of the at least three gas streams would be a polymer material recycling/cleaning/reforming system. The polymer cleaning system may include carbon dioxide cleaning of the polymeric materials, pellitizing of the clean solid polymer, and even molding or reforming of the pelletized polymer, using at least in-part energy from the burning of hydrocarbon gas from the at least three gas streams. Solvents may also be added to the carbon dioxide to assist in removing grease, oils, paints, labels and other materials that should not be recycled with the polymer. A preferred solvent system for removal of label stock in polymeric container recycling includes a mixture (5:95% by volume to 95-5% by volume) of at least one cosolvent selected from the group consisting of terpene alcohol, d-Limonene, and isoparaffinic hydrocarbons and at least a second cosolvent selected from the group consisting of C1-C6 alkyl lactates (especially C1, C2, C3 and C4 alkyl lactates, such as methyl lactate, ethyl lactate, propyl lactate and butyl lactate). Such materials are commercially available as a terpene alcohol based solvent such as environmentally safe Tarksol®, made by Tarksol, Inc., d-Limonene (Chemical Abstract Series No. 5989-27-5), or isoparaffinic hydrocarbon (Chemical Abstract Series No. 64742-48-9). These label cleaning cosolvent systems are proprietary to assignee and the subject of a copending patent application bearing Ser. No. 10/852,307. These solvents may be used on the label containing (preferably shredded) polymeric materials according to the teachings of U.S. Pat. No. 6,514,353, which teaches the use of only the first set of solvents as label removing materials. That patent is incorporated by reference for its teachings of solvent application processes, apparatus and materials.

D-limonene is known in certain cleansing solutions such as taught by Dotolo et al. (U.S. Pat. No. 5,346,652) describe a non-aqueous fingernail polish remover based upon a d-limonene, N-methyl pyrrolidone (abbreviated NMP), and cetyl acetate solvent system. However, d-limonene is harmful if swallowed, can be irritating, causes drying, reddening, and sensitization of the skin, and is moderately to highly irritating to the eyes (MSDS, d-limonene, Florida Chemical Co., Inc., Winter Haven, Fla.). Similarly, Bayless (U.S. Pat. No. 5,372, 742) describes a non-aqueous liquid cleaner suited for removing nail polish, based upon d-limonene, ethyl lactate, and cetyl acetate. The use of this novel cosolvent-based carbon dioxide, polymer-cleaning system (particularly for the removal of labels) is novel in its own right.

In addition to the cosolvent or individual solvent systems used with or without carbon dioxide cleaning in the described technology, additional solvents or cleaners may be added to the system with varying benefits or distractions. Among these are terpenes, halohydrocarbons, certain glycol ethers, polyols, ethers, esters of glycol ethers, esters of fatty acids and other long chain carboxylic acids, fatty alcohols and other long-chain alcohols, short-chain alcohols, polar aprotic solvents, siloxanes, hydrofluoroethers, dibasic esters, and aliphatic hydrocarbons solvents or similar solvents or mixtures of such solvents are organic solvents that can be used in the present technology.

TABLE 1

GAS ANALYSIS REPORT
by Atlantic Analytical Laboratory (AAL, Whitehouse, NJ)
ACRION'S CO2 WASH PROCESS DEMONSTRATION UNIT
NJ ECOCOMPLEX/BURLINGTON COUNTY LANDFILL/
September 2001

|  | Raw Landfill Gas | | Methane Product | |
| --- | --- | --- | --- | --- |
|  | ppm volume | DL ppm | ppm volume | DL ppm |
| Non-Condensable Gases | | | | |
| Nitrogen | 6.7 | 0.01 | 9.6 | 0.01 |
| Oxygen | | 0.10 | | 0.10 |
| Hydrogen | | 0.10 | | 0.10 |
| Carbon Dioxide | 35.0 | 0.01 | 25.7 | 0.01 |
| Volatile Hydrocarbons | | | | |
| Methane | 49.6% | 1 | −62.6% | 1 |
| Ethylene | 3 | 1 | 3 | 1 |
| Acetylene | Nd | 10 | nd | 10 |
| Ethane | 2 | 1 | 2 | 1 |
| Propylene | Nd | 1 | nd | 1 |
| Propane | 41 | 1 | 14 | 1 |
| Isobutane | 13 | 1 | | 1 |
| n-Butane | 8 | 1 | nd | 1 |
| Butenes | Nd | 1 | nd | 1 |
| Isopentane | 2 | 1 | nd | 1 |
| n-Pentane | 2 | 1 | nd | 1 |
| Hexanes | 200 | 1 | nd | 1 |
| Volatile Sulfur Compounds | | | | |
| Hydrogen Sulfide | Nd | | nd | 0.05 |
| Carbonyl Sulfide | 1.10 | | 0.1 | 0.05 |
| Sulfur Dioxide | Nd | | nd | 0.05 |
| Methyl Mercaptan | Nd | | nd | 0.05 |
| Ethyl Mercaptan | Nd | | nd | 0.05 |
| Dimethyl Sulfide | 4.00 | | nd | 0.05 |
| Carbon Disulfide | 0.46 | | nd | 0.05 |
| Isopropyl Mercaptan | Nd | | nd | 0.05 |
| Methyl Ethyl Sulfide | 0.06 | | nd | 0.05 |
| n-Propyl Mercaptan | Nd | | nd | 0.05 |
| t-Butyl Mercaptan | 0.26 | | nd | 0.05 |
| Dimethyl Disulfide | 1.00 | | nd | 0.05 |
| sec-Butyl Mercaptan | 0.16 | | nd | 0.05 |
| Isobutyl Mercaptan | 0.26 | | nd | 0.05 |
| Diethyl Sulfide | Nd | | nd | 0.05 |
| n-Butyl Mercaptan | 0.12 | | nd | 0.05 |
| GC/MS Results TO-14 Target List | | | | |
| Freon-12 | 2.8 | | nd | 0.5 |
| Methyl Chloride | Nd | 0.5 | nd | 0.5 |
| Freon-114 | 0.5 | | nd | 0.5 |
| Vinyl Chloride | 0.5 | | nd | 0.5 |
| Methyl Bromide | Nd | 0.5 | nd | 0.5 |
| Ethyl Chloride | Nd | 0.5 | nd | 0.5 |
| Freon-11 | Nd | 0.5 | nd | 0.5 |
| Vinylidene Chloride | Nd | 0.5 | nd | 0.5 |
| Freon-113 | Nd | 0.5 | nd | 0.5 |
| Dichloromethane | Nd | 0.5 | nd | 0.5 |
| 1,1-Dichlorethane | Nd | 0.5 | nd | 0.5 |
| cis-1,2-Dichloroethylene | 1.2 | | nd | 0.5 |
| Chloroform | Nd | 0.5 | nd | 0.5 |
| 1,1,1-Trichloroethane | Nd | 0.5 | nd | 0.5 |
| 1,2-Dichlorethane | Nd | 0.5 | nd | 0.5 |
| Benzene | 0.8 | | nd | 0.2 |
| Carbon Tetrachloride | Nd | 0.5 | nd | 0.5 |
| 1,2-Dichloropropane | 5.1 | | nd | 0.5 |
| Trichloroethylene | 0.7 | | nd | 0.2 |
| cis-1,3-/Dichloropropylene | Nd | 0.5 | nd | 0.5 |
| trans-1,3-Dichloropropylene | Nd | 0.5 | nd | 0.5 |
| Toluene | 38.0 | | nd | 0.2 |
| 1,1,2-Trichloroethane | Nd | 0.2 | nd | 0.2 |
| 1,2-Dibromoethane | Nd | 0.5 | nd | 0.5 |
| Tetrachloroethylene | 1..5 | | nd | 0.2 |

TABLE 1-continued

GAS ANALYSIS REPORT
by Atlantic Analytical Laboratory (AAL, Whitehouse, NJ)
ACRION'S CO2 WASH PROCESS DEMONSTRATION UNIT
NJ ECOCOMPLEX/BURLINGTON COUNTY LANDFILL/
September 2001

|  | Raw Landfill Gas | | Methane Product | |
| --- | --- | --- | --- | --- |
|  | ppm volume | DL ppm | ppm volume | DL ppm |
| Chlorobenzene | Nd | 0.2 | nd | 0.2 |
| Ethyl Benzene | 14.0 |  | nd | 0.2 |
| m+p-Xylenes | 15.0 |  | nd | 0.2 |
| Styrene | 4.4 |  | nd | 0.2 |
| o-Xylene | 4.2 |  | nd | 0.2 |
| 1,1,2,2-Tetrachloroethane | Nd | 0.2 | nd | 0.2 |
| 4-Ethyltoluene | 6.2 |  | nd | 0.2 |
| 1,3,5-Trimethylbenzene | 1.2 |  | nd | 0.2 |
| 1,2,4-Trimethylbenzene | 1.2 |  | nd | 0.2 |
| 1,3-Dichlorobenzene | Nd | 0.2 | nd | 0.2 |
| 1,4-Dichlorobenzene | Nd | 0.2 | nd | 0.2 |
| Benzylchloride | Nd | 0.2 | nd | 0.2 |
| 1,2-Dichlorobenzene | Nd | 0.2 | nd | 0.2 |
| 1,2,4-Trichlorobenzene | Nd | 0.2 | nd | 0.2 |
| Hexachlorobutadiene | Nd | 0.2 | nd | 0.2 |
| GC/MS Results Non-TO-14 Target List |  |  |  |  |
| Propane | 41 |  | 14 |  |
| Isobutane | 13 |  | nd | 0.5 |
| Acetone | 21 |  | nd | 0.5 |
| Methylethyl Ketone | 40 |  | nd | 0.5 |
| 2-butanol | 38 |  | nd | 0.5 |
| C6H12O2 | 28 |  | nd | 0.5 |
| C9 Aliphatic Hydrocarbon | 32 |  | nd | 0.5 |
| Alpha-Pinene | 38 |  | nd | 0.5 |
| C11 Aliphatic Hydrocarbon | 16 |  | nd | 0.5 |
| D-Limonene | 15 |  | nd | 0.5 |
| GC/MS Results Toxic Substances Sub-17 |  |  |  |  |
| Freon 12 |  |  | nd | 10 |
| Vinyl Chloride |  |  | nd | 10 |
| Chloroform |  |  | nd | 10 |
| 1,2-Dichloroethane |  |  | nd | 10 |
| Benzene |  |  | nd | 10 |
| Carbon Tetrachloride |  |  | nd | 10 |
| Trichloroethylene |  |  | nd | 10 |
| 1,4-Dioxane |  |  | nd | 10 |
| 1,1,2-Trichloroethane |  |  | nd | 10 |
| 1,2-Dibromoethane |  |  | nd | 10 |
| Tetrachloroethylene |  |  | nd | 10 |
| 1,1,2,2 Tetrachloroethane |  |  | nd | 10 |
| Methylene Chloride |  |  | nd | 10 |
| 1,1,1-Trichloroethane |  |  | nd | 10 |

NOTES:
AAL 6061-1: raw landfill gas after compression to 400 psig and water knockout
AAL-6061-3: product gas from CO2 wash
DL = Detection Limit, if not shown, reported result is greater than DL
nd = concentration is less than stated DL
— = test not performed
ppm = parts per million
ppb = parts per billion Any form of landfill source or other solids disposal site can be used in the practice of the present invention, including by way of non-limiting examples, area landfills, trench landfills, and ramp landfills. The landfills may be lined or unlined, although lined landfills (with clay or polymeric materials) are predominant in modern constructions. Preferred are municipal solid waste (MSW) landfills with restrictions or absolute exclusions on the presence of toxic waste materials.

Figure 5:
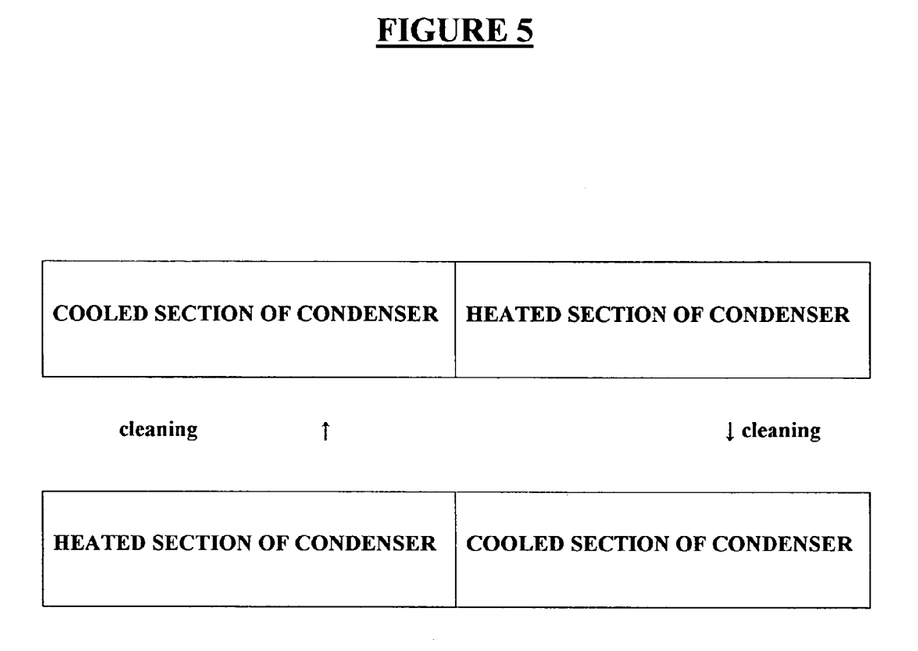
FIG. 5 shows a schematic drawing of a carbon dioxide recovery system.

MSW landfills may be segmented into cells, with distinct time frames of waste present in distinct cells or separate compartments of the site. LFG collection may be distinct from each cell, and where undesirable (e.g., toxic) emissions are found in one cell, source of the landfill gas may be switched to another site. Also, as a cell emission rate diminishes, LFG collection may be readily shifted to another cell, allowing the tired site to 'refresh' and recover so that it can emit at a satisfactory rate at a later time. This will maximize removal of gas from each cell and each landfill site. FIG. 5 shows a unique approach to the cleaning operation, recycling operation and energy conservation.

A liquefied gas cleaning system is provided in which a refrigeration system is used to re-condense the gaseous solvent to a liquid. The condensation occurs in the cooled section of the condenser the gaseous solvent is evaporated (leaving behind waste material picked up during cleaning operations) in the heated section of the condenser. The refrigeration system may by way of example, consist of a compressor, an expansion valve, and a heat exchanger. The heat exchanger is cooled by the liquid gas in a pressurized tank. The heat causes the liquid (solvent) to boil (or otherwise evaporate), thereby distilling the liquid and providing clean liquid (solvent). Also, in a two solvent cleaning system, (first solvent pre-wash, then second cleaning with a pressurized fluid), an additional heat exchanger could be placed in the first wash solvent to warm the solvent for better cleaning performance (reference is made to U.S. Pat. No. 6,558,432 which is incorporated herein by reference for that background technology). A final air heat exchanger may be used if the refrigeration system coolant is not cooled enough by the first two heat exchangers. The cold side of the refrigeration system can be used to re-condense the distilled gaseous solvent back to the liquid phase. This process can take place in two separate tanks, or in the same tank. FIG. 5 shows the process occurring in two tanks. The liquefied gas solvent could be carbon dioxide, propane, etc.

Figure 6:
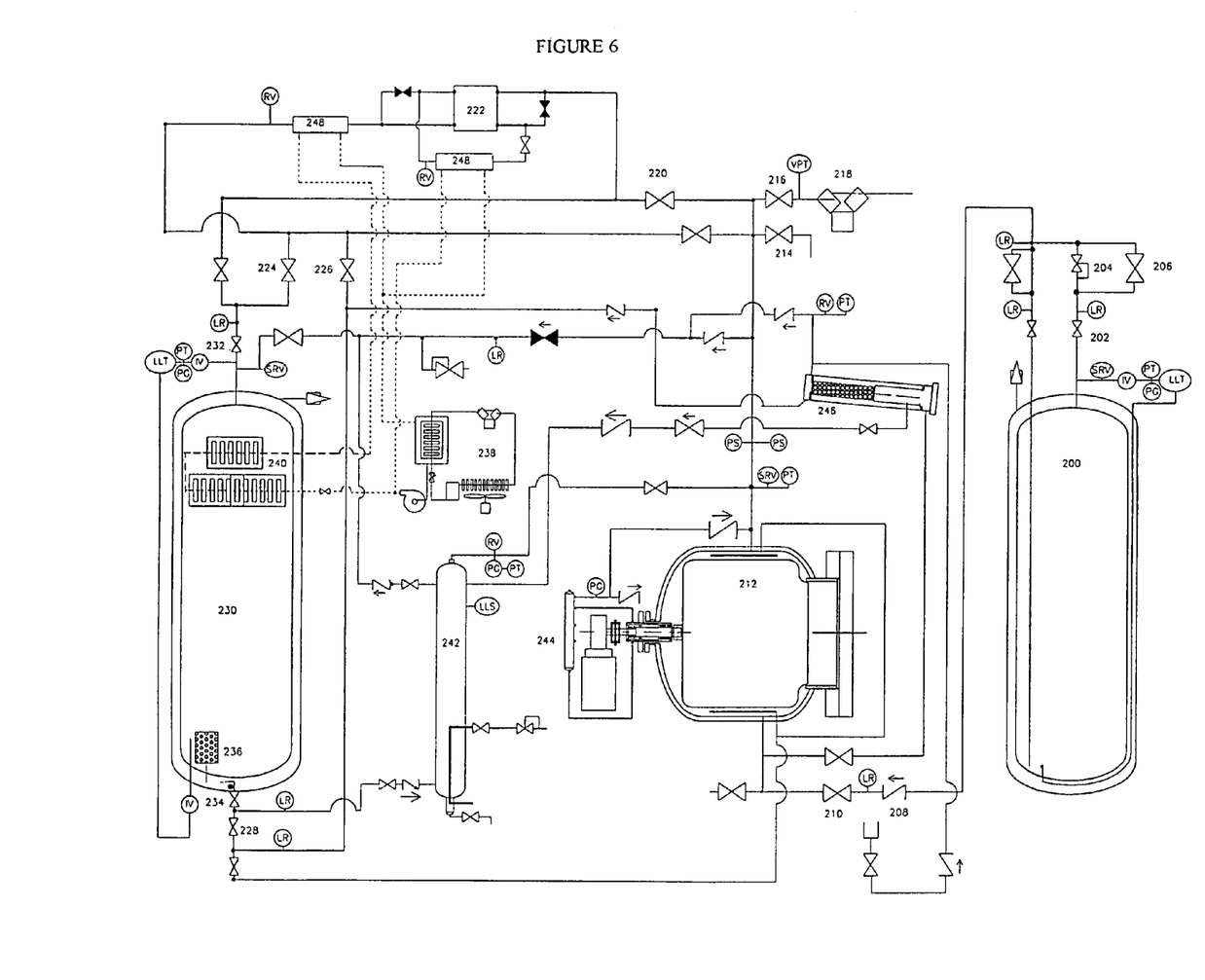
FIG. 6 shows a schematic of another unique apparatus and process described herein.

FIG. 6 shows a schematic of one possible embodiment of a complete cooling system VI according to the present invention. The cooling system VI comprises a vacuum insulated storage tank 200 for storing liquid carbon dioxide. The carbon dioxide is passed through tube system 202 into other elements of the system such as an isolation valve IV, pressure gauge PG, pressure transmitter PT, liquid level transmitter LLT (which senses variations in pressure between the top of the tank and bottom of the tank, giving an indication of the height of liquid within the tank), supplemental release valve SLV, backpressure regulator 204, line releases LR, check valves 208, the like. One of a number of functions that can be provided by the system of FIG. 6, in addition to cleaning can be described as follows.

When carbon dioxide liquid is replenished into a tank 200 as in the cleaning system VI, gaseous carbon dioxide has been traditionally vented, as its presence in the tank prevents complete filling of the tank. In the present sequent of steps that forms a novel process, the gaseous carbon dioxide is vented through 202 into the cleaning wheel area 212, where in a separate process or separate step, liquid carbon dioxide is added as the cleaning solvent. In this case, the wheel stores vented carbon dioxide which can be transmitted via a carbon dioxide compressor 222 into the top of cooling (liquefying) tank 230, and/or through still 242 to the carbon dioxide condenser 222 into the top of the cooling tank 230 or through filter (e.g., carbon black) media 246 and then into the top of the cooling tank 230. In this manner, vented carbon dioxide from the primary storage tank can be used as a source of liquid carbon dioxide. It is also possible to vent the gaseous carbon dioxide and recirculate the carbon dioxide as cooled liquid from cooling tank 230 (which may have a water cooling system such as shown 238) or have it stored in the cooling tank 230. The wheel or drum cleaner 212 may thus be used as a storage tank for vented carbon dioxide in one process or one step of a larger systemic process, and then be used as the solvent scrubbing chamber at another time in the systemic process.

The wheel drum 212 agitates the ground plastic and carbon dioxide which is drawn through pipes 213 for cleaning. The motor 244 powers the rotation of the drum. Portions of the carbon dioxide stream (which is now contaminated with material) can be vented through pipes 213 are sent through various control valves into the filter 246,and/or the condensing system 248 and 222, and/or the cooling tank 230 comprising a water chiller 238 and condensing coils 240 to condense and chill the carbon dioxide to assist in forming additional liquid cleaner grade carbon dioxide from the vented carbon dioxide. Cleansed carbon dioxide can be recycled through valves back to the wheel drum during a cleaning cycle.

Although specific examples and constructions and materials have been used to emphasize the generic concepts of the present invention, these are intended to be non-limiting examples, and not to be absolute limits in the scope of practice of the invention. Alternatives, variations and differences will be understood by those of ordinary skill in the art within the scope of the technology described.

What is claimed is:

1. A process for use of gases collected from a solid/liquid material waste site comprising:
    collecting gases from the material waste site
    separating the collected gases into at least three streams comprising a hydrocarbon stream, a carbon dioxide stream, and residue stream,
    condensing at least a portion of the carbon dioxide stream or hydrocarbon stream to a liquid or supercritical liquid,
    using at least a portion of the hydrocarbon stream to generate energy, and
    using energy from the hydrocarbon stream to power a commercial process comprising cleaning with carbon dioxide as a cleaning material and optionally at least one process selected from the group consisting of carbon dioxide liquefaction, hydrogen production, carbon black production, cleaning with carbon dioxide as a cleaning material, molding polymeric materials, and pelletizing polymeric materials;
    wherein prior to cleaning with carbon dioxide, material to be cleaned is exposed to a solvent comprising at least one $C_1$-$C_6$ alkyl lactate.

2. The process of claim 1 wherein the solvent comprises a cosolvent system comprising at least one first cosolvent selected from the group consisting of terpene alcohol, d-Limonene, and isoparaffinic hydrocarbons and the least one cosolvent selected from the group comprising of $C_1$-$C_6$ alkyl lactate.

3. The process of claim 2 wherein the solid material waste site comprises a landfill.

4. The process of claim 3 wherein the commercial process includes at least on-site cleaning use of liquid carbon dioxide or supercritical carbon dioxide.

5. The process of claim 2 wherein the commercial process includes using liquid carbon dioxide or supercritical carbon dioxide in a polymeric material cleaning process.

6. The process of claim 3 wherein the commercial process includes using liquid carbon dioxide or supercritical carbon dioxide in a polymeric material cleaning process that is part of a solid polymer recycling process.

7. The process of claim 3 wherein the commercial process includes using liquid carbon dioxide or supercritical carbon dioxide in a polymeric material cleaning process that is part of a polymer recycling process wherein venting of gases, separating of gases into at least three streams, burning of a portion of the hydrocarbon stream, and use of energy from burning to power a process that takes place within an 18 km radius from the separation of gases into at least three gas streams.

8. The process of claim 6 wherein the commercial process includes using liquid carbon dioxide or supercritical carbon dioxide in a polymeric material cleaning process that is part of a polymer recycling process wherein venting of gases, separating of gases into at least three streams, burning of a portion of the hydrocarbon stream, and use of energy from burning the hydrocarbon stream in a process that takes place within an 18 km radius from the separation of gases into at least three gas streams.

9. The process of claim 7 wherein plastic is reduced in size to smaller segments of solid plastic during the polymer recycling process, and the smaller segments of plastic are cleaned with carbon dioxide from the carbon dioxide stream.

10. The process of claim 9 wherein the carbon dioxide stream used to clean the smaller segments comprises supercritical liquid carbon dioxide.

11. The process of claim 10 wherein a solvent is used to remove material from the smaller segments of polymer in advance of or at the same time as the use of carbon dioxide used to clean the smaller segments of polymer.

12. The process of claim 11 wherein the solvent is an organic solvent to assist in the dissolving of adhesive or glue on the smaller segments of polymer.

13. The process of claim 1 wherein at least some hydrocarbon gas is used in a carbon black production process.

14. A system of combined processes, in combination with at least one carbon dioxide cleaning process, at least one of the combined processes operating from a power source of at least three gas streams from a waste gas stream site are selected from the group consisting of;
    a) energy production, carbon black production, and hydrogen production;
    b) energy production, carbon dioxide liquification, supercritical or liquid carbon dioxide formation, and apparel cleaning;
    c) energy production, carbon dioxide liquification, supercritical or liquid carbon dioxide formation, and plastic cleaning;
    d) energy production, carbon dioxide liquification, supercritical or liquid carbon dioxide formation, plastic cleaning and pellitization of cleaned plastic;
    e) energy production, carbon dioxide liquification, supercritical or liquid carbon dioxide formation, plastic cleaning, plastic pellitization, and plastic molding or extrusion;
    f) energy production, carbon dioxide liquification, supercritical or liquid carbon dioxide formation, and aluminum cleaning;
    g) energy production, carbon dioxide liquification, supercritical or liquid carbon dioxide formation, aluminum cleaning, and cleaned aluminum ingot/sheeting formation;
    h) energy production, carbon dioxide liquification, supercritical or liquid carbon dioxide formation, and glass/ceramic cleaning; and
    i) energy production, carbon dioxide liquification, supercritical or liquid carbon dioxide formation, glass cleaning and glass melting processes, j) energy production, carbon dioxide liquification, supercritical or liquid carbon dioxide formation and solvent distillation processes wherein energy production comprises providing at least some energy derived from combustion of hydrocarbon gases from at least one of said three gas streams; and wherein in the cleaning process prior to cleaning with carbon dioxide, material to be cleaned is exposed to a solvent comprising at least one $C_1$-$C_6$ alkyl lactate and then exposed to the cleaning carbon dioxide.

15. The system of claim 14 wherein the solvent is a cosolvent system of at least one first cosolvent selected from the group consisting of terpene alcohol, d-Limonene, and isoparaffinic hydrocarbons and the least one cosolvent selected from the group comprising of $C_1$-$C_6$ alkyl lactate.

16. The system of claim 14 where the waste gas stream site comprises a site having distinct cells of landfill waste mass and controls are present so that waste gas stream sites may be opened and closed from selected cells to control waste gas flow through the system.

17. The system of claim 16 where the waste gas stream site comprises a site having distinct piping to areas of a landfill waste site and controls are present so that waste gas stream sites may be opened and closed from selected areas of the landfill waste site to control waste gas flow through the system.

18. A process for the cleaning of waste polymeric material comprising:
providing solid polymer material,
reducing the size of the solid polymeric material into segments of solid polymeric material,
at least surface contacting the segments of solid polymeric material with a cleaning solvent,
removing cleaning solvent to provide partially cleaned segments of solid polymeric material, and
cleaning the partially cleaned segments of solid polymeric material with densified carbon dioxide;
wherein the solvent is a solvent system comprising $C_1$-$C_6$ alkyl lactate or a cosolvent system of at least one first cosolvent selected from the group consisting of terpene alcohol, d-Limonene, and isoparaffinic hydrocarbons and the least one second cosolvent selected from the group comprising of $C_1$-$C_6$ alkyl lactate.

19. The process of claim 18 wherein the densified carbon dioxide comprises liquid carbon dioxide or supercritical carbon dioxide.

20. The process of claim 19 wherein the solid polymeric material comprises polymeric material having label material adhered thereto.

21. A liquefied-gas cleaning system in combination with the system of claim 14 in which gas cleaning material is recycled within the system comprising:
a liquefied-gas cleaner storage tank;
a vent from the liquefied-gas cleaner storage tank to assist in conveying gas phase of the liquid cleaner to a cleaning region when the cleaning region is not cleaning with liquid gas so that vented gas may be stored as stored gas,
a second venting system for transporting stored gas to a cooling tank where gas cleaner is cooled to a liquid as recycled liquefied gas and
a further conveying system by which recycled liquefied-gas is introduced into the cleaning tank as a cleaning solvent or is placed into the liquefied-gas cleaner storage tank.

22. A system of combined processes operating from a source of at least three gas streams from a waste gas stream site are selected from the group consisting of:
k) energy production, carbon black production, and hydrogen production;
l) energy production, carbon dioxide liquification, supercritical or liquid carbon dioxide formation, and apparel cleaning;
m) energy production, carbon dioxide liquification, supercritical or liquid carbon dioxide formation, and plastic cleaning;
n) energy production, carbon dioxide liquification, supercritical or liquid carbon dioxide formation, plastic cleaning and pellitization of cleaned plastic;
o) energy production, carbon dioxide liquification, supercritical or liquid carbon dioxide formation, plastic cleaning, plastic pellitization, and plastic molding or extrusion;
p) energy production, carbon dioxide liquification, supererifical or liquid carbon dioxide formation, and aluminum cleaning;
q) energy production, carbon dioxide liquification, supercritical or liquid carbon dioxide formation, aluminum cleaning, and cleaned aluminum ingot/sheeting formation;
r) energy production, carbon dioxide liquification, supercritical or liquid carbon dioxide formation, and glass/ceramic cleaning; and
s) energy production, carbon dioxide liquification, supercritical or liquid carbon dioxide formation, glass cleaning and glass melting processes,
t) energy production, carbon dioxide liquification, supercritical or liquid carbon dioxide formation and solvent distillation processes
wherein energy production comprises providing at least some energy derived from combustion of hydrocarbon gases from at least one of said three gas streams where the waste gas stream site comprises a site having distinct cells of landfill waste mass and controls are present so that waste gas stream sites may be opened and closed from selected cells to control waste gas flow through the system wherein at least some carbon dioxide from a carbon dioxide stream is used in a polymeric cleaning process, and cleaned polymer from the polymer cleaning process is pelletized and label removed from pelletized polymer using a cosolvent system comprising at least a first cosolvent selected from the group consisting of terpenes, D-limonene and parafinnic hydrocarbons, and at least one second cosolvent selected from the group consisting of $C_1$-C6 alkyl lactates; and;
carbon dioxide cleaning material is recycled within a cleaning and recycling portion of the system that comprises;
a liquefied carbon dioxide storage tank;
a vent from the liquefied carbon dioxide storage tank to assist in conveying a gas phase of the carbon dioxide cleaning material to a cleaning region when the cleaning region is not in a cleaning mode with liquid gas so that vented gas may be stored as stored gas,
a second venting system for transporting stored gas to a cooling tank where gas cleaner is cooled to a liquid as recycled liquefied carbon dioxide and
a further conveying system by which recycled liquefied carbon dioxide is introduced into the cleaning tank as a cleaning solvent or is placed into the liquefied carbon dioxide storage tank.

* * * * *